US010015365B2

(12) United States Patent
Robinson et al.

(10) Patent No.: US 10,015,365 B2
(45) Date of Patent: Jul. 3, 2018

(54) SYSTEM AND METHOD FOR PRINTING A SPOT COLOR PROOF

(71) Applicant: Xerox Corporation, Norwalk, CT (US)

(72) Inventors: David C. Robinson, Penfield, NY (US);
Timothy D. Uetz, Penfield, NY (US);
Nan M. Stumbo, Fairport, NY (US)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 15/269,152

(22) Filed: Sep. 19, 2016

(65) Prior Publication Data

US 2018/0084155 A1 Mar. 22, 2018

(51) Int. Cl.
*H04N 1/60* (2006.01)
*H04N 1/00* (2006.01)
*G06F 3/12* (2006.01)

(52) U.S. Cl.
CPC ......... *H04N 1/6008* (2013.01); *G06F 3/1268* (2013.01); *H04N 1/00015* (2013.01); *H04N 1/00018* (2013.01); *H04N 1/00023* (2013.01); *H04N 1/00045* (2013.01); *H04N 1/00082* (2013.01); *H04N 1/00408* (2013.01)

(58) Field of Classification Search
None
See application file for complete search history.

(56) References Cited

U.S. PATENT DOCUMENTS

| 2004/0032602 | A1* | 2/2004 | Teraue | H04N 1/6011 358/1.9 |
| 2009/0040563 | A1* | 2/2009 | Mestha | G03G 15/50 358/2.1 |
| 2015/0098099 | A1* | 4/2015 | Matsumoto | H04N 1/6008 358/1.9 |
| 2016/0070995 | A1* | 3/2016 | Van Dun | G06K 15/026 358/1.18 |

* cited by examiner

*Primary Examiner* — Lennin Rodriguezgonzalez (57) ABSTRACT

A method, non-transitory computer readable medium and apparatus for printing a spot color proof are disclosed. For example, the method includes receiving a request to print a print job, determining one or more spot colors in the print job, translating the one or more spot colors into a respective color value of a color model used by a printer that is selected to print the print job, generating the spot color proof that includes a patch of each one of the one or more spot colors printed in the respective color value and the respective color value, and printing the spot color proof.

14 Claims, 4 Drawing Sheets

SYSTEM AND METHOD FOR PRINTING A SPOT COLOR PROOF

The present disclosure relates generally to printing spot colors and, more particularly, to a system and method for printing a spot color proof.

BACKGROUND

Some customers have print jobs that include spot colors. For example, a customer may have text or digital graphics that include spot colors that they would like to have printed. On certain offset printers that can use the actual spot colors, the spot colors can be matched exactly when printing.

However, some digital printers are limited by manufacturing restraints to a limited set of process colorants and cannot use spot colorants. The digital printer is forced to develop a best match, for spot color requests within a job, using the colorants loaded on the printer. Therefore, the customer may want to know how the spot colors will render on the digital printer before committing to print the entire job. For example, the customer may want to avoid printing a very large print job with spot color requests to find out that the spot colors of the printed text and/or graphics do not perfectly match, or are not visually close enough to the spot colors as they would appear on an offset press.

SUMMARY

According to aspects illustrated herein, there are provided a method, non-transitory computer readable medium and apparatus for printing a spot color proof. One disclosed feature of the embodiments is a method that receives a request to print a print job, determines one or more spot colors in the print job, translates the one or more spot colors into a respective color value of a color model used by a printer that is selected to print the print job, generates the spot color proof that includes a patch of each one of the one or more spot colors printed in the respective color value and the respective color value and prints the spot color proof.

Another disclosed feature of the embodiments is a non-transitory computer-readable medium having stored thereon a plurality of instructions, the plurality of instructions including instructions which, when executed by a processor, cause the processor to perform operations that receive a request to print a print job, determine one or more spot colors in the print job, translate the one or more spot colors into a respective color value of a color model used by a printer that is selected to print the print job, generate the spot color proof that includes a patch of each one of the one or more spot colors printed in the respective color value and the respective color value and print the spot color proof.

Another disclosed feature of the embodiments is an apparatus comprising a processor and a computer-readable medium storing a plurality of instructions which, when executed by the processor, cause the processor to perform operations that receive a request to print a print job, determine one or more spot colors in the print job, translate the one or more spot colors into a respective color value of a color model used by a printer that is selected to print the print job, generate the spot color proof that includes a patch of each one of the one or more spot colors printed in the respective color value and the respective color value and print the spot color proof.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method and apparatus for printing a spot color proof. As discussed above, some customers have print jobs that include spot colors. For example, a customer may have text or digital graphics that include spot colors that they would like to have printed. On certain offset printers that can use the actual spot colors, the spot colors can be matched exactly when printing.

However, some digital printers are limited by manufacturing restraints to a limited set of process colorants and cannot use spot colorants. The digital printer is forced to develop a best match, for spot color requests within a job, using the colorants loaded on the printer. Therefore, the customer may want to know how the spot colors will render on the digital printer before committing to print the entire job. For example, the customer may want to avoid printing a very large print job with spot color requests to find out that the spot colors of the printed text or graphics do not perfectly match, or are not visually close enough to the spot colors as they would appear on an offset press.

Embodiments of the present disclosure provide a novel method and apparatus that generate and print a spot color proof before the print job is committed for printing. The spot colors are translated into a color values associated with a color profile selected for the printer (e.g., a cyan, magenta, yellow, black (also referred to as "key"), x (CMYK(x), where "x" is one or more additional colorant such as orange and/or green). The customer may then review what the spot colors will look like when printed on a particular printer. If the customer wants to adjust the how the spot colors appear, the customer may make further adjustments to the spot colors on the printer. As a result, the customer can be assured that the spot colors may be accurate to a customer's satisfaction on the printer.

Figure 1:
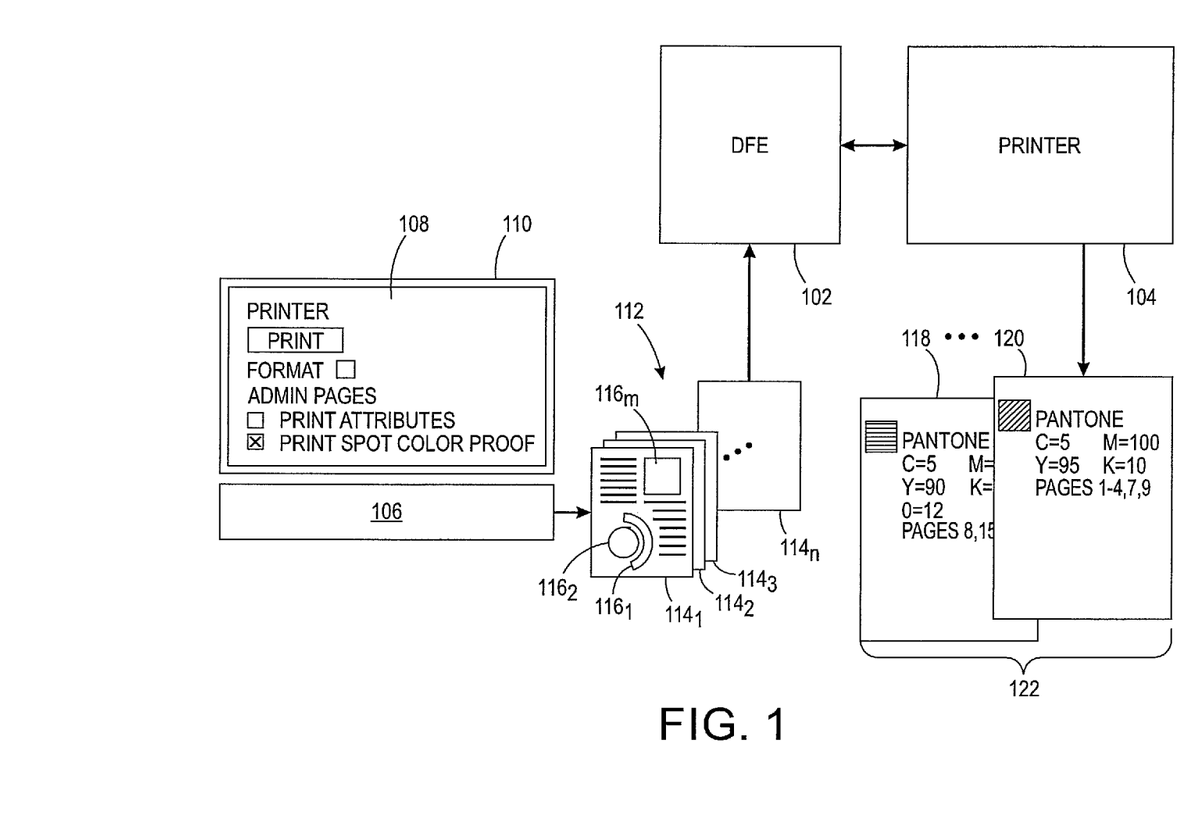
FIG. 1 illustrates an example system of the present disclosure.

FIG. 1 illustrates an example system 100 of the present disclosure. In one embodiment, the system 100 includes a digital front end (DFE) 102 in communication with a printer 104 and an endpoint device 106. The DFE 102 may be communicatively coupled to the printer 104 as part of an overall printing device or multi-function device (MFD). The DFE 102 may be communicatively coupled to the endpoint device 106 via a wired or wireless connection.

In one embodiment, the DFE 102 may include a processor, or controller, and a computer readable storage medium for storing one or more modules and instructions for performing the functions described herein. The DFE 102 may perform the functions described herein and cause the printer 104 to print the spot color proof, the print job, and the like. In one embodiment, the endpoint device 106 may be any type of endpoint device that includes a processor and a computer readable storage medium for storing instructions that are executed by the processor. Examples of the endpoint device 106 may include, for example, a desktop computer, a laptop computer, a tablet computer, a smartphone, and the like.

In one embodiment, the endpoint device 106 may have a display 110 for displaying a graphical user interface (GUI) 108. The GUI 108 may display print options when a customer submits a print job to the DFE 102 to be printed on the printer 104. The GUI 108 may be associated with a print queue or print jobs of a print system that are on hold. The GUI 108 may include various options such as a drop down menu to select a printer, a sub menu to select various formatting features, and the like.

In one embodiment, the GUI 108 may include a new option to print a spot color proof as part of a sub menu for administrative (admin) pages. For example, when the option to print the spot color proof is selected by the customer, the DFE may initiate a process to generate and print the spot color proof on a banner page and to hold the print job until the spot colors are approved. Once the spot colors are approved, the customer may confirm the print job for printing via the GUI 108. For example, a "continue" button may be displayed in the GUI 108.

In one embodiment, the print job may be a document 112. The document 112 may include one or more pages $114_1$ to $114_n$ (hereinafter referred to individually as a page 114 or collectively as pages 114). The pages 114 may include one or more graphics or text $116_1$ to $116_m$ (hereinafter referred to individually as graphic 116 or collectively as graphics 116) that use a spot color.

In one embodiment, the term "graphics" and "text" may refer to types of objects that may be found in print jobs that are processed in a printer document language (PDL) format. For example, in a PDL format, a page may have one or more of an image, text and/or a graphic. An image may be for example a photograph that is printed in a red, green, blue color scheme. Text may refer to alphanumeric characters. A graphic may refer to a logo, a computer generated file, and the like. In one embodiment, texts and graphics may be printed in spot colors, but images are generally not printed in spot colors. In one embodiment, a spot color may be defined as a custom color. For example, example spot color systems may include Pantone®, Toyo, and the like.

In one embodiment, the print job may be received by the DFE 102 with an indication to print the spot color proof. In response, the DFE 102 may scan the print job to identify one or more spot colors that are in the print job. For example, the DFE 102 may scan the digital file, or code, associated with the print job. When a graphic in the print job uses a spot color, the digital file may call out a specific spot color (e.g., Pantone Red 032C, Pantone 2257C, Pantone 101C, and the like). The DFE 102 may identify, or determine, each one of the one or more spot colors that is used in the print job.

The DFE 102 may then translate each one of the spot colors into a color model that used by the printer 104. For example, the color model may be a CMYK(x) color model. In one embodiment, the color model may be based on a destination profile that is selected by the customer. For example, the printer 104 may be a CMYK(x) printer that has different destination profiles for different media types. The printer 104 may have CMYK destination profile and a CMYKOrange destination profile for both glossy media types and uncoated media types.

In one embodiment, the DFE 102 may perform the translation by converting the spot colors that are determined into the L-a-b color space. The L-a-b color values may then be converted into values associated with the color model of the printer 104. For example, if the printer 104 is a CMYK (x) printer, the L-a-b color values associated with the spot colors may be converted into CMYK(x) values.

In one embodiment, the DFE 102 may store a spot color translation library. The spot color translation library may store pre-defined conversions for spot colors into values of the color model used by the printer 104, or the L-a-b color values into values of the color model used by the printer.

In one embodiment, the translation of the spot colors into a color model that is used by the printer 104 may also be media type dependent. For example, the same spot color printed on different types of media (e.g., glossy bright white paper versus matte paper with a blue hue) may appear differently. Thus, the translation of the spot color may also depend on the type of media that is used for each spot color.

The print job may include the media type for each page 114 of the document 112 in the print job. The customer may provide a media profile for the selected media type. The media profile may define one or more parameters associated with the media type (e.g., color of the media, gloss, size, thickness, brightness, and the like). If the customer does not provide the media profile, a default media profile associated with media type may be used by the DFE 102. In one embodiment, the media type may also determine which destination profile is used by the printer 104 for a particular spot color.

In one embodiment, the DFE 102 may then print a spot color proof 122. The spot color proof 122 may include one or more pages 118 and 120. Although two pages are shown in FIG. 1, it should be noted that the spot color proof 122 may be a single page or more than two pages. In one embodiment, each page 118 and 120 may include a patch of the spot color, a name of the spot color, the respective values in the color model of the printer 104 (e.g., CMYK(x) color values), the pages 114 within the document 112 that use the spot color, and the like).

In one embodiment, the spot color proof 122 may include multiple pages 118 and 120 when all of the patches of the spot color cannot fit onto a single page. In one embodiment, the spot color proof 122 may include multiple pages when more than one media type is used within the document 112. For example, the page 118 may include the patches of spot colors printed on a glossy media type and the page 120 may include the patches of spot colors printed on non-glossy media type.

In one embodiment, the DFE 102 may identify common spot colors and consolidate multiple instances of the same spot color into a single patch in the spot color proof 122. For example, if Pantone 032C on non-glossy media is used on pages 1-4, 7 and 9 of the document 112, the DFE 102 may consolidate the multiple instances of Pantone 032C into a single patch rather than printing 6 different patches of the same spot color.

In one embodiment, the spot color proof 122 may be printed as part of a banner page. Since the spot color proof 122 is not part of the print job that is submitted, the DFE 102 may instruct an administration facility module (shown in FIG. 3 and discussed in further detail below) to generate a banner page to print the spot color proof 122. For example, the banner page is a separate document that is generated by the DFE 102 that is not part of the document 112 in the print job that was submitted by the customer.

In one embodiment, the customer may then review each patch associated with the spot colors used in the document 112 that are printed in the spot color proof 122. The spot color proof 122 provides the customer with a visual example of exactly what the spot color will look like when printed on the selected media type using the color model associated with the printer 104. The customer may then decide whether adjustments should be made to one or more of the spot colors. The customer may make adjustments to one or more of the spot colors via the GUI 108 and the endpoint device 106.

Once the customer is satisfied, the customer may enter confirmation to the DFE 102 (e.g., via the GUI 108 and the endpoint device 106). After the DFE 102 receives the confirmation from the customer, the DFE 102 may release the document 112 in the print job for printing on the printer 104. As a result, the customer may be assured that the spot colors used in the document 112 will be accurately printed.

Figure 2:
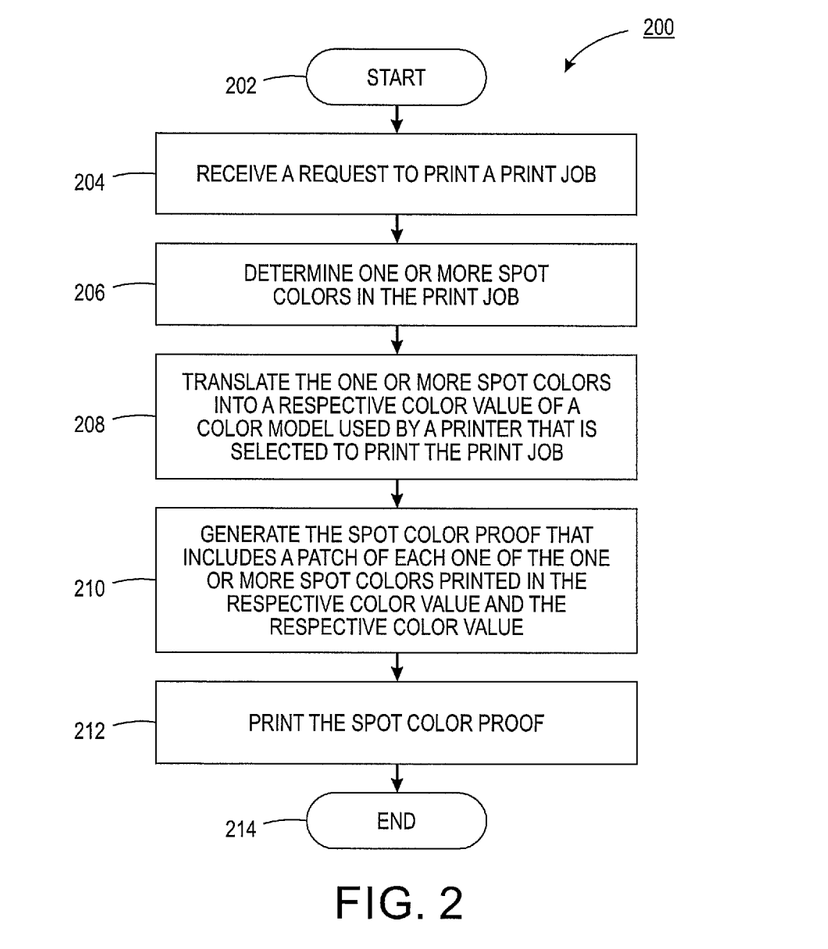
FIG. 2 illustrates a flowchart of an example method for printing a spot color proof.
Figure 4:
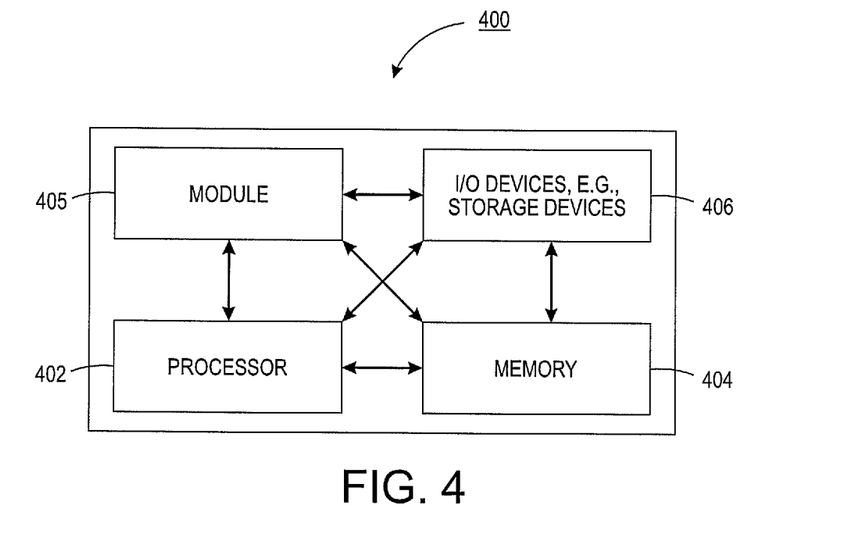
FIG. 4 illustrates a high-level block diagram of a computer suitable for use in performing the functions described herein.

FIG. 2 illustrates a flowchart of an example method 200 for printing a spot color proof. In one embodiment, one or more steps or operations of the method 200 may be performed by the DFE 102 or a computer as illustrated in FIG. 4 and discussed below.

At block 202, the method 200 begins. At block 204, the method 200 receives a request to print a print job. For example, a customer may submit a print job that includes a document. The document may have one or more pages that include one or more text or graphics using spot colors. In one embodiment, the print job may be requested with an indication to print a spot color proof before executing the print job. In other words, the print job may be held or placed in a queue until the spot color proof is printed and approved.

At block 206, the method 200 determines one or more spot colors in the print job. For example, the digital file or code associated with the print job (e.g., a PDL version of the print job) may be scanned to search for calls to spot colors. For example, the digital file or code may specifically call out spot colors such as Pantone 101C, Pantone 2196C, and the like.

At block 208, the method 200 translates the one or more spot colors into a respective color value of a color model used by a printer that is selected to print the print job. In one embodiment, the spot colors may each be translated by converting the spot colors into an L-a-b color space. The values of the L-a-b color space may then be converted into the respective color value of the color model that is used for the printer. For example, if the color model is a CMYK(x) color model, the L-a-b color values may be converted into a C value, a Y value, an M value, a K value, and optionally an x value.

In one embodiment, the translation from the one or more spot colors into the respective color value of the color model used by the printer may also be based on a destination profile and a media type. The destination profile may define the CMYK values for a particular color. The CMYK values for the same spot color may be different depending on the destination profile that is selected.

The media type may be associated with one or more parameters. The one or more parameters may define how a particular color will appear on the media. For example, the same spot color may appear differently on glossy media versus uncoated media. The one or more parameters may include, for example, gloss, size, thickness, brightness, and the like.

In one embodiment, the printer may be associated with a plurality of different destination profiles of the color model. In addition, different destination profiles may be associated with different media types. In one example, a CMYK(x) printer may have a CMYK destination profile for glossy media, a CMYKOrange destination profile for glossy media, a CMYK destination profile for uncoated media, a CMYKOrange destination profile for uncoated media and the like. The destination profile and the parameters associated with the media type may be defined by the customer when the print job is submitted to the DFE 102. If the parameters associated with the media type are not defined by the customer a default media profile may be used.

In one embodiment, a pre-defined spot color library may be used to perform the translation. The pre-defined spot color library may include the conversion values from the spot color to the CMYK(x) values based on the type of media that is selected and the destination profile.

At block 210, the method 200 generates the spot color proof that includes a patch of each one of the one or more spot colors printed in the respective color value and the respective color value. In one embodiment, common spot colors may be consolidated into a single patch on the spot color proof. The spot color proof may be generated as a separate banner page from the document of the print job. The spot color proof may include a patch of each one of the one or more spot colors (e.g., a visual example of what the spot color will look like on the selected type of media), a name of the spot color, the translated values in the color model associated with the printer (e.g., the CMYK(x) values), the page numbers the spot color appears in the document of the print job, and the like.

At block 212, the method 200 prints the spot color proof. For example, the spot color proof may be printed as a banner page. The spot color proof may be printed before the document of the print job is printed.

The customer may make any desired adjustments to the CMYK(x) values to improve the accuracy or appearance of the spot colors on the selected printer and the process may be repeated to print the spot color proof with the adjustments made by the customer. Once the customer is satisfied, the customer may submit a confirmation to proceed with the print job. When the confirmation is received, the print job may be released from hold or the print queue to be printed. At block 214, the method 200 ends.

Figure 3:
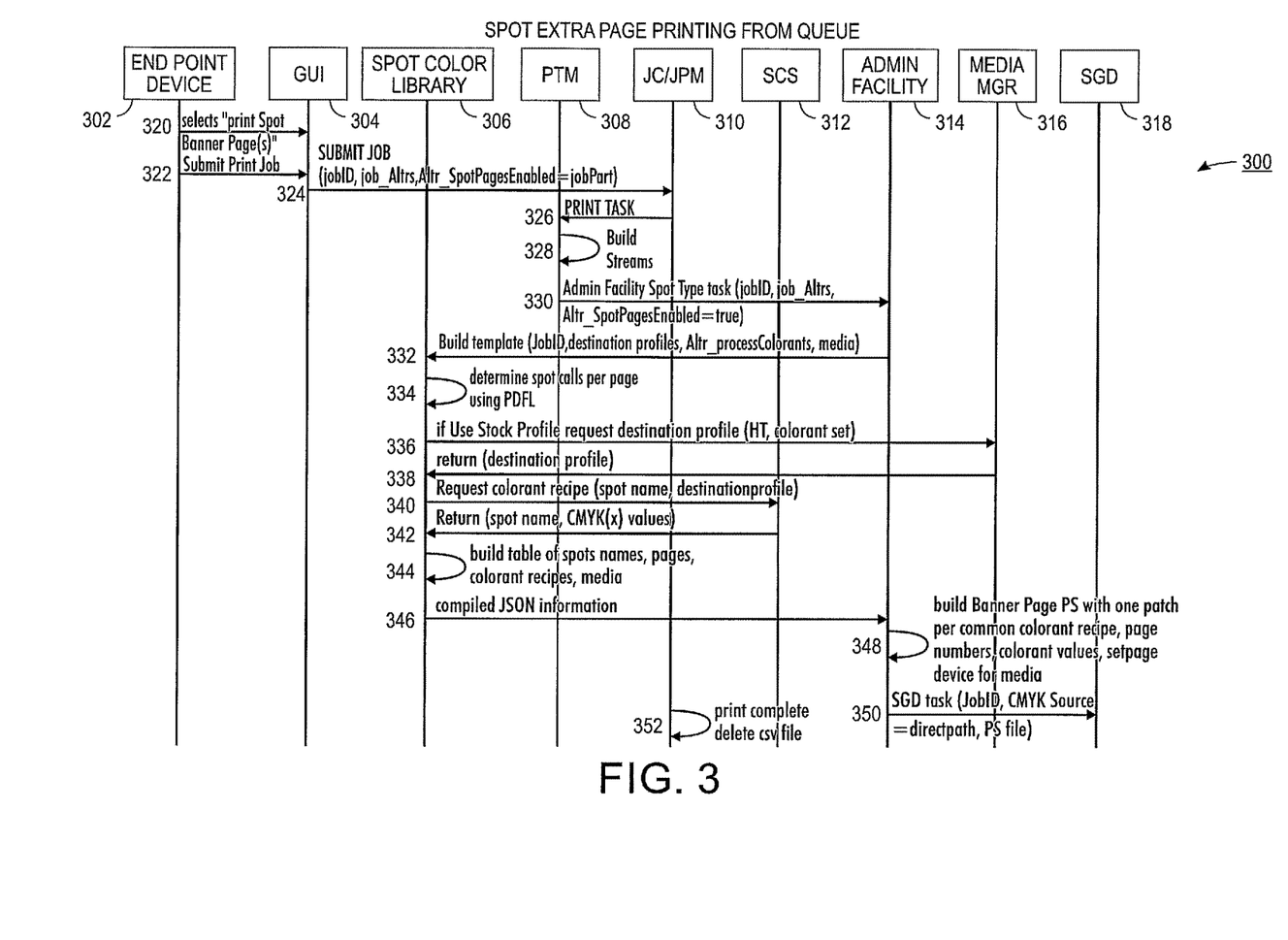
FIG. 3 illustrates an example system flow of a method for printing a spot color proof.

FIG. 3 illustrates an example system flow 300 of a method for printing a spot color proof. It should be noted that FIG. 3 illustrates one example system flow. In other words, additional modules or different modules may also be used without departing from the scope of the present disclosure.

In one embodiment, the system flow 300 may include a spot color library 306, a print task manager (PTM) 308, a job chooser (JC)/job pool manager (JPM), a spot color service (SCS) module 312, an administrative (admin) facility module 314, a media manager (mgr) 316 and a system generated decomposer module (SGD) 318. In one embodiment, the spot color library 306, the PTM 308, the JC/JPM, the SCS module 312, the admin facility module 314, the media manager 316 and the SGD 318 may be part of the DFE 104 illustrated in FIG. 1. In one embodiment, the system flow 300 may also include an endpoint device 302 (e.g., similar to the endpoint device 106 illustrated in FIG. 1) and a GUI 304 (e.g., similar to the GUI 108 illustrated in FIG. 1).

In one embodiment, the spot color library 306 may store the pre-defined spot color values. The PTM 308 may be the controller or brains of the DFE 102. The PTM 308 may be responsible for building the various streams for a print job request and starting the printing of the print jobs. The JC/JPM 310 may manage the print jobs in a queue and ensure that the attributes associated with the print jobs are set correctly. The SCS 312 provides the colorant recipes. The admin facility 314 builds the admin pages, such as a banner page. As noted above, the spot color proof may be printed on a banner page that is generated by the admin facility 314. The media manager 316 may keep track of what type of media is loaded, the profiles or attributes associated with a selected type of media, and the like. The SGD 318 may create the bit maps to be printed (e.g., the actual patches of the spot colors and the arrangement of the patches on the banner page for the spot color proof, the bit maps of graphics in the document for the print job request, and so forth).

At step 320, the endpoint device 302 receives a selection from a customer to print a spot color proof. In one embodiment, the spot color proof may also be referred to as a spot banner page.

At step 322, the endpoint device 302 submits the print job. For example, the endpoint device 302 may submit the print job via the GUI 304. At step 324, the print job is submitted via the GUI 304 to the JC/JPM 310. The print job may include parameters such as a job identification (job ID), one or more job attributes (job_Attrs), an indication that the print spot color proof is enabled (e.g., Attr_SpotPagesEnabled=true), and the like.

At step 326, the JC/JPM 310 may send a message to the PTM 308 to initiate the task of generating and printing the spot color proof. At step 328, the PTM 308 may build one or more streams associated with the task. For example, one of the streams may be associated with having the admin facility 314 generate the spot color proof on a banner page.

At step 330, the PTM 308 sends the generated stream associated with the task of generating the spot color proof to the admin facility 314. The stream may include one or more parameters similar to the parameters included with the print job request (e.g., a job identification (job ID), one or more job attributes (job_Attrs), an indication that the print spot color proof is enabled (e.g., Attr_SpotPagesEnabled=true), and the like).

At step 332, the admin facility 314 may send a build template command to the spot color library 306. The build template command may include the job ID, the selected destination profiles, the selected type of media and the colorants used to print the spot colors.

At step 334, the spot color library 306 may determine the spot colors that are used in the print job. As discussed above, the digital file or code associated with a document in a print job may be scanned to determine the one or more spot colors that are used. In one embodiment, a pre-flight software package may be used to scan the document for the one or more spot colors. One example of a pre-flight software package may be a portable document format library (PDFL). However, any type of language may be used.

Steps 336 and 338 may be optional steps. For example, if the parameters or the media profile associated with the selected type of media are provided by the customer (e.g., via the endpoint device 302), then steps 336 and 338 may be skipped. However, if no media profile is provided, the spot color library 306 may send a request to the media manager 316 for a default media profile associated with a particular type of media at optional step 336. At optional step 338, the media manager 316 may provide the default media profiles to the spot color library 306.

At step 340, the spot color library 306 may send a request to the SCS 312 for the colorant recipes for the spot color name that is determined and based on a selected destination profile. At step 342, the SCS 312 may return the CMYK(x) values for the spot color name to the spot color library 306.

At step 344, the spot color library may build a table of the spot colors that are used, the associated CMYK(x) values, the type of media that the spot colors are printed on, the pages that the spot color appears on, and the like. At step 346, the compiled information may be sent to the admin facility 314. In one embodiment, the information may be compiled in a Java script object notation (JSON) format.

At step 348, the admin facility 314 may build the spot color proof. For example, the admin facility 314 may build a banner page with the patches for each spot color, the associated CMYK(x) values, the type of media that the spot colors are printed on, the pages that the spot color appears on, and the like. In one embodiment, the admin facility 314 may consolidate common spot colors with a single patch.

At step 350, the SGD task may be generated for the spot color proof and sent to the SGD 318. The SGD task may include the job ID, the CMYK source=directpath attribute, the printer source (PS) file information, and the like that results in the printing of the spot color proof. At step 352, the JC/JPM may then delete the .csv file associated with the spot color proof in the queue after the spot color proof is printed.

It should be noted that although not explicitly specified, one or more steps, functions, or operations of the methods 200 and 300 described above may include a storing, displaying and/or outputting step as required for a particular application. In other words, any data, records, fields, and/or intermediate results discussed in the methods can be stored, displayed, and/or outputted to another device as required for a particular application.

FIG. 4 depicts a high-level block diagram of a computer that can be transformed into a machine that is dedicated to perform the functions described herein. As a result, the embodiments of the present disclosure improve the operation and functioning of an endpoint device to submit a print job for printing in a pull printing system during failure of the pull printing system, as disclosed herein.

As depicted in FIG. 4, the computer 400 comprises one or more hardware processor elements 402 (e.g., a central processing unit (CPU), a microprocessor, or a multi-core processor), a memory 404, e.g., random access memory (RAM) and/or read only memory (ROM), a module 405 for printing a spot color proof, and various input/output devices 406 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computer may employ a plurality of processor elements. Furthermore, although only one computer is shown in the figure, if the method(s) as discussed above is implemented in a distributed or parallel manner for a particular illustrative example, i.e., the steps of the above method(s) or the entire method(s) are implemented across multiple or parallel computers, then the computer of this figure is intended to represent each of those multiple computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 405 for printing a spot color proof (e.g., a software program comprising computer-executable instructions) can be loaded into memory 404 and executed by hardware processor element 402 to implement the steps, functions or operations as discussed above in connection with the example methods 200 and 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 405 for printing a spot color proof (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for printing a spot color proof, comprising:
   receiving, by a processor, a request to print a print job;
   determining, by the processor, one or more spot colors in the print job, wherein the determining comprises:
     scanning, by the processor, a digital code of the print job to identify a call for a spot color;
   translating, by the processor, the one or more spot colors into a respective color value of a color model used by a printer that is selected to print the print job;
   generating, by the processor, the spot color proof that includes a patch of each one of the one or more spot colors printed in the respective color value and the respective color value;
   printing, by the processor, the spot color proof;
   receiving, by the processor, a confirmation that the respective color value of the each one of the one or more spot colors in the spot color proof is acceptable; and
   printing, by the processor, the print job.

2. The method of claim 1, wherein the translating comprises:
   determining, by the processor, a type of media and a destination profile associated with the each one of the one or more spot colors; and
   finding, by the processor, the respective color value of the each one of the one or more spot colors in a pre-defined spot color library based on the type of media and the destination profile.

3. The method of claim 2, wherein the type of media and the destination profile are determined by a customer selection.

4. The method of claim 1, wherein the color model comprises a cyan, magenta, yellow, black, x (CMYK(x)) color model.

5. The method of claim 1, wherein the generating comprises:
   consolidating, by the processor, common spot colors of the one or more spot colors into a single patch in the spot color proof.

6. The method of claim 1, wherein the spot color proof is printed on a banner page.

7. A non-transitory computer-readable medium storing a plurality of instructions, which when executed by a processor, cause the processor to perform operations for printing a spot color proof, the operations comprising:
   receiving a request to print a print job;
   determining one or more spot colors in the print job, wherein the determining comprises:
     scanning a digital code of the print job to identify a call for a spot color;
   translating the one or more spot colors into a respective color value of a color model used by a printer that is selected to print the print job;
   generating the spot color proof that includes a patch of each one of the one or more spot colors printed in the respective color value and the respective color value;
   printing the spot color proof;
   receiving a confirmation that the respective color value of the each one of the one or more spot colors in the spot color proof is acceptable; and
   printing the print job.

8. The non-transitory computer-readable medium of claim 7, wherein the translating comprises:
   determining a type of media and a destination profile associated with the each one of the one or more spot colors; and
   finding the respective color value of the each one of the one or more spot colors in a pre-defined spot color library based on the type of media and the destination profile.

9. The non-transitory computer-readable medium of claim 8, wherein the type of media and the destination profile are determined by a customer selection.

10. The non-transitory computer-readable medium of claim 7, wherein the color model comprises a cyan, magenta, yellow, black, x (CMYK(x)) color model.

11. The non-transitory computer-readable medium of claim 7, wherein the generating comprises:
    consolidating common spot colors of the one or more spot colors into a single patch in the spot color proof.

12. The non-transitory computer-readable medium of claim 7, wherein the spot color proof is printed on a banner page.

13. A method for printing a spot color proof, comprising:
    receiving, by a processor, a request to print a print job;
    receiving, by the processor, a request to print the spot color proof before printing the print job;
    determining, by the processor, one or more spot colors in the print job and a media profile associated with a media type that is selected for each one of the one or more spot colors, wherein the determining comprises:
      scanning, by the processor, a digital code of the print job to identify a call for a spot color;
    translating, by the processor, the one or more spot colors into a respective cyan, magenta, yellow, key, x (CMYK (x)) color value based on the media profile associated with the media type and a destination profile selected by a customer for the each one of the one or more spot colors;

consolidating, by the processor, common spot colors that use a same media type into a single patch in the spot color proof;

generating, by the processor, the spot color proof that includes the single patch of the each one of the one or more spot colors printed in the respective CMYK(x) color value, the respective CMYK(x) color value and one or more page numbers that the each one of the one or more spot colors appears in the print job;

printing, by the processor, the spot color proof;

receiving, by the processor, a confirmation that the respective color value of the each one of the one or more spot colors in the spot color proof is acceptable; and printing, by the processor, the print job.

14. The method of claim 13, wherein the receiving the request to print the spot color proof comprises sending a request to an admin facility module of the printer to prepare a banner page for printing the spot color proof.

\* \* \* \* \*